(12) United States Patent
Folkesson et al.

(10) Patent No.: US 11,026,440 B2
(45) Date of Patent: Jun. 8, 2021

(54) TEMPERATURE TREATMENT APPARATUS AND METHOD FOR SOLIDIFYING PORTIONS OF FLUID

(71) Applicant: JOHN BEAN TECHNOLOGIES AB, Helsingborg (SE)

(72) Inventors: Mathias Folkesson, Helsingborg (SE); Stefan Paulsson, Helsingborg (SE)

(73) Assignee: JOHN BEAN TECHNOLOGIES AB, Helsingborg (SE)

( * ) Notice: Subject to any disclaimer, the term of this patent is extended or adjusted under 35 U.S.C. 154(b) by 244 days.

(21) Appl. No.: 15/318,653

(22) PCT Filed: Jun. 12, 2015

(86) PCT No.: PCT/EP2015/063192
§ 371 (c)(1),
(2) Date: Dec. 13, 2016

(87) PCT Pub. No.: WO2015/189398
PCT Pub. Date: Dec. 17, 2015

(65) Prior Publication Data
US 2017/0127706 A1    May 11, 2017

(30) Foreign Application Priority Data
Jun. 13, 2014  (EP) .................................. 14172406

(51) Int. Cl.
*A23L 3/36* (2006.01)
*F25D 13/06* (2006.01)
(Continued)

(52) U.S. Cl.
CPC ................. *A23L 3/36* (2013.01); *A23P 30/10* (2016.08); *F25D 3/11* (2013.01); *F25D 13/067* (2013.01); *F25D 25/04* (2013.01); *A23V 2002/00* (2013.01)

(58) Field of Classification Search
CPC . F25D 3/11; F25D 3/127; F25D 13/06; F25D 13/062; F25D 13/067; F25D 25/04;
(Continued)

(56) References Cited

U.S. PATENT DOCUMENTS 993,321 A * 5/1911 Coddington ............ B29C 33/26
425/100
2,021,047 A * 11/1935 Chilton ..................... F25C 1/10
62/345
(Continued)

FOREIGN PATENT DOCUMENTS

CN    1249666 A    4/2000
CN    1257573 A    6/2000
(Continued)

OTHER PUBLICATIONS

Atkins, T., & Escudier, M. (2013). impingement. In (Ed.), A Dictionary of Mechanical Engineering. : Oxford University Press,. Retrieved Apr. 30, 2019, from http://www.oxfordreference.com/view/10.1093/acref/9780199587438.001.0001/acref-9780199587438-e-3075. (Year: 2013).*
(Continued)

*Primary Examiner* — Jianying C Atkisson
*Assistant Examiner* — Miguel A Diaz
(74) *Attorney, Agent, or Firm* — Christenson O'Connor Johnson Kindness PLLC

(57) ABSTRACT

The present invention relates to a temperature treatment apparatus (1) for solidifying portions of fluid. The apparatus comprises an endless product conveyor belt (7) comprising a plurality of moulds (8) made of elastic material, each of the plurality of moulds having an open end and each of the plurality of moulds being arranged to convey a portion of fluid during solidifying of the same, a first impingement temperature treatment device (4) arranged in a first tempera-
(Continued)

ture treatment zone (A), a second impingement temperature treatment device (5) arranged in a second temperature treatment zone (B), wherein the first temperature treatment zone is arranged upstream the second temperature treatment zone with regard to a direction of movement of the portions of fluid during use of the apparatus, wherein the first temperature treatment zone is arranged to solidify a crust on the portions of fluid at least on a surface of the fluid closest to the open end of the moulds when the moulds comprising portions of fluid are conveyed through the first temperature treatment zone, and wherein the second temperature treatment zone is arranged to further solidify each portion of foodstuffs such that at least partly solidified portions are formed when the moulds comprising portions of fluid are conveyed through the second temperature treatment zone.

16 Claims, 5 Drawing Sheets

(51) Int. Cl.
  *F25D 25/04* (2006.01)
  *A23P 30/10* (2016.01)
  *F25D 3/11* (2006.01)

(58) Field of Classification Search
  CPC ... A23L 3/36; A23L 3/37; A23L 3/375; A23B 4/06; A23B 4/08; A23B 4/09; A23P 30/10; B65G 9/20
  See application file for complete search history.

(56) References Cited

U.S. PATENT DOCUMENTS

| | | | | |
|---|---|---|---|---|
| 2,080,103 A * | 5/1937 | Zarstschenzeff | A23L 3/361 62/63 |
| 3,427,820 A * | 2/1969 | Hart | A23L 3/375 62/307 |
| 3,618,334 A * | 11/1971 | Gram | F25D 13/065 62/345 |
| 4,075,869 A * | 2/1978 | Fitsall | F25D 3/11 62/374 |
| 4,481,782 A * | 11/1984 | Mukerjee | F25D 3/11 198/952 |
| 4,802,839 A * | 2/1989 | Hidawa | A23G 1/205 249/127 |
| 4,881,379 A * | 11/1989 | Sakai | A23B 4/064 62/380 |
| 5,351,495 A * | 10/1994 | Lermuzeaux | A23L 3/375 62/374 |
| 5,359,858 A * | 11/1994 | Miller | A23G 9/18 62/345 |
| 5,394,707 A * | 3/1995 | Miller | A23G 9/18 62/345 |
| 5,444,985 A * | 8/1995 | Lang | F25D 3/11 62/374 |
| 5,460,015 A * | 10/1995 | Venetucci | A23L 3/362 62/374 |
| 5,478,584 A | 12/1995 | Donohue et al. | |
| 5,813,237 A * | 9/1998 | Grace | A23L 3/362 62/374 |
| 5,966,962 A * | 10/1999 | Murray | F25D 13/06 62/374 |
| 6,167,708 B1 * | 1/2001 | Cloarec | A23L 3/361 62/374 |
| 6,393,859 B1 * | 5/2002 | Olsson | A23G 1/26 62/345 |
| 9,648,898 B2 * | 5/2017 | Strand | A23L 3/36 |
| 10,448,660 B2 * | 10/2019 | Linck | A23P 30/10 |
| 2002/0152764 A1 * | 10/2002 | Berghoff | A23L 3/362 62/380 |
| 2003/0074904 A1 * | 4/2003 | Miller | B65G 15/48 62/63 |
| 2003/0224092 A1 * | 12/2003 | Newman | A21C 15/00 426/281 |
| 2006/0248913 A1 * | 11/2006 | Gasteyer, III | F25D 13/067 62/374 |
| 2009/0053370 A1 * | 2/2009 | Smith | A23G 1/0086 426/104 |
| 2009/0120107 A1 | 5/2009 | Oztas et al. | |
| 2010/0179676 A1 * | 7/2010 | Alessandria | A23G 1/205 700/99 |
| 2011/0311700 A1 * | 12/2011 | Shah | A23B 4/064 426/518 |
| 2012/0047916 A1 * | 3/2012 | Wijlens | A23L 3/362 62/63 |
| 2013/0084373 A1 * | 4/2013 | Linck | F25D 25/04 426/305 |
| 2013/0125576 A1 * | 5/2013 | Newman | A23L 3/375 62/380 |
| 2014/0072688 A1 * | 3/2014 | Strand | A23L 23/00 426/531 |
| 2014/0230460 A1 * | 8/2014 | Newman | A23L 3/362 62/52.1 |
| 2015/0196049 A1 * | 7/2015 | Lang | A23L 3/362 62/63 |
| 2016/0263777 A1 * | 9/2016 | Previero | B29B 17/02 |
| 2017/0127706 A1 * | 5/2017 | Folkesson | F25D 13/067 |
| 2018/0058744 A1 * | 3/2018 | Newman | F25B 19/005 |
| 2018/0103661 A1 * | 4/2018 | Newman | A23L 3/375 |
| 2019/0239684 A1 * | 8/2019 | Sahlstrom | A47J 37/044 |

FOREIGN PATENT DOCUMENTS

| | | | | |
|---|---|---|---|---|
| CN | 101809386 A | 8/2010 | | |
| FR | 1 211 534 A | 3/1960 | | |
| FR | 2 964 836 A1 | 3/2012 | | |
| FR | 2964836 A1 * | 3/2012 | | A23L 3/361 |
| JP | 11-155541 A | 6/1999 | | |
| WO | 00/38533 A1 | 7/2000 | | |
| WO | 2009/012780 A2 | 1/2009 | | |
| WO | 2015/189398 A1 | 12/2015 | | |

OTHER PUBLICATIONS

International Search Report and Written Opinion dated Jul. 7, 2015, issued in corresponding International Application No. PCT/EP2015/063192, filed Jun. 12, 2015, 10 pages.
Chinese First Office Action and Search Report dated Oct. 16, 2018, issued in corresponding Chinese Application No. 201580030625.5, filed Jun. 12, 2015, 18 pages.
EP Communication pursuant to Article 94(3) EPC dated Oct. 17, 2018, issued in corresponding European Application No. EP 14172406.2, filed Jun. 13, 2014, 5 pages.
Summons to Attend Oral Proceedings Pursuant to Rule 115(1) EPC, mailed May 16, 2019, issued in corresponding European Application No. 14172406.2, filed Jun. 13, 2014, 10 pages.
Third Office Action and Search Report dated Jan. 16, 2020, in Chinese Patent Application No. 2015800306255, filed Jun. 12, 2015, with English translation, 20 pages.
Xu, Xueqin (editor), "Machine and Equipment in Food Factory," pp. 293-296, China Light Industry Press, Jan. 2008 (see English translation of Third Office Action for relevance at pp. 7, 11, 12).

* cited by examiner

TEMPERATURE TREATMENT APPARATUS AND METHOD FOR SOLIDIFYING PORTIONS OF FLUID

BACKGROUND OF THE INVENTION

The present invention is related to temperature treatment of fluid especially solidifying portions of fluid. Typically but not necessarily the fluid is food in fluid form.

An apparatus for temperature treatment, especially freezing, of fluid food products are known from for example US 2009/0120107. The apparatus of US 2009/0120107 contains a bottomless honeycomb conveyor belt and freezing of the products are realized by means of liquid nitrogen. Stripping of the frozen portions is realized by protrusions pushing through the bottomless honeycomb conveyor belt. Stripping of the frozen product is made by means of positive impressions forced into orifices of the belt pushing the ice cubes out of the belt. Disadvantages with such known devices include that bottomless moulds may leak and that the freezing involves use of cryogenic liquids. Further, the stripping results in contact between the protrusions and the frozen food product, which may be undesirable.

It is desired with an apparatus and a method for efficient solidifying portions of fluid without disadvantages of prior art.

SUMMARY OF THE INVENTION

An object of the present invention is to provide an apparatus and a method for efficient solidifying portions of fluid without disadvantages of prior art.

Another object of the present invention is to provide an apparatus and a method for efficient and rapid freezing of portions of fluid.

Yet another object of the present invention is to provide an apparatus and a method for efficient and rapid freezing of portions of fluid, which does not involve cryogenic freezing.

According to a first aspect of the present invention, there is provided a temperature treatment apparatus for solidifying portions of fluid, the apparatus comprising: an endless product conveyor belt comprising a plurality of moulds made of elastic material, each of the plurality of moulds having an open end and each of the plurality of moulds being arranged to convey a portion of fluid during solidifying of the same. The temperature treatment apparatus comprising a first impingement temperature treatment device arranged in a first temperature treatment zone and a second impingement temperature treatment device arranged in a second temperature treatment zone, wherein the first temperature treatment zone is arranged upstream the second temperature treatment zone with regard to a direction of movement of the portions of fluid during use of the apparatus, wherein the first temperature treatment zone is arranged to solidify a crust on the portions of fluid at least on a surface of the fluid closest to the open end of the moulds when the moulds comprising portions of fluid are conveyed through the first temperature treatment zone, and wherein the second temperature treatment zone is arranged to further solidify each portion of foodstuffs such that at least partly solidified portions are formed when the moulds comprising portions of fluid are conveyed through the second temperature treatment zone.

By fluid herein is intended any product, material, matter, or composition that can flow, which comprises a liquid, and which may or may not include solid material, such as solid material in the form of small particles and up to large chunks or pieces. The fluid may, thus, for example be a fluid, a liquid suspension, a solution, or mixtures thereof. The fluid may e.g. be food in fluid form. The food in fluid form may for example be juice, milk, soup, syrup, or other aqueous solutions, suspensions or mixtures, or solutions, suspension or mixtures with oil; or mixtures thereof.

Solidifying, as used herein, comprises converting of the fluid to solid, or any solidifying of the fluid resulting in either portions of fluid with solid properties or with higher viscosity compared to prior to the solidifying. The solidifying may be made by lowering or increasing the temperature of the portions of fluid by the impingement device. For example, in the case of lowering the temperature, the solidifying may be freezing, and in the case of increasing the temperature, the solidifying may be hardening, curing or baking of the fluid. It is not a prerequisite that the whole portion of fluid is converted to solid. It may be sufficient that the portions of fluid are made easier to handle by the solidifying, for example that they are solidified to such an extent that they can be ejected from the moulds essentially without changing their shape, and that they do not easily deform or stick together after being ejected from the moulds.

The impingement device is an efficient means for temperature treatment. For example in the case of lowering the temperature or freezing, the solidifying does not require cryogenic fluids interacting with the matter to be solidified, and which result in rapid solidifying.

The impingement device having a first and a second temperature treatment zone allows for zones with different temperature treatment effects and as a result extra efficient solidifying.

It is realized that the solidifying in the second temperature treatment zone can but must not result in a portion of foodstuff being solidified to the core. Of importance is that the portion of fluid is solidified on the surface(s), such that it can be ejected from the moulds in one piece and such that it can be efficiently handled after ejection.

The temperature treatment effect in the first temperature treatment zone may be lower than the temperature treatment effect in the second temperature treatment zone, By the temperature treatment effect being lower in the first temperature treatment zone as compared to the second temperature treatment zone, is meant that the average pressure subjected on the surface of the portion of the foodstuff by the impingement jets is lower in the first temperature treatment zone as compared with the second temperature treatment zone.

According to one embodiment the moulds may have bottoms. With such moulds leaking of fluid from the moulds is avoided or minimized. Further, contact between the apparatus and the fluid may be minimized.

According to one embodiment the impingement devices may be arranged to apply impingement jets from above the endless product conveyor in the first and second temperature treatment zones. Such application of the impingement jets results in efficient and rapid solidifying of the portions of fluid as the fluid is directly hit by the impingement jets.

According to one embodiment the temperature treatment apparatus may further have a third impingement temperature treatment device arranged to apply impingement jets from below the moulds. With such a third temperature treatment zone, solidifying of the portions of fluid may be yet more rapid. This since the portions of fluid may be subjected to impingement temperature treatment from two sides simultaneously. Further, impingement temperature treatment from the below combined with moulds having bottoms may be performed at high temperature treatment effect without risking any fluid to be blown out of the moulds.

According to one embodiment, the endless product conveyor belt may be arranged to continuously transport the plurality of moulds conveying the portions of fluid.

According to one embodiment, the solidify a crust may be freeze a crust, and the solidify each portion of fluid such that at least partially solidified portions are formed may be freeze each portion of foodstuffs such that at least partially frozen portions of fluid are formed.

According to one embodiment, the apparatus may further comprise a shaft about which the endless product conveyor belt is arranged to travel and wherein the shaft is arranged for ejecting the at least partially solidified portions from the plurality of moulds. Solidified portions may efficiently be ejected from the moulds with such an arrangement since the moulds are made of elastic material. Such an apparatus further benefits from not needing any other mechanical device for ejecting the solidified portions.

According to one embodiment, each of the plurality of moulds may be arranged to deform when contacted by the shaft, whereby the at least partially solidified portions are ejected from the plurality of moulds. Thus, the solidified portions may be ejected efficiently.

According to one embodiment, the apparatus may further comprise a drive shaft arranged to drive the endless product conveyor belt.

According to one embodiment, the apparatus may further comprise a drive and ejection shaft arranged to drive the endless product conveyor belt and arranged for ejecting the at least partially frozen portions of foodstuffs from the plurality of moulds.

According to one embodiment, the apparatus may further comprise a dispensing device arranged to dispense the portions of fluid in the plurality of moulds.

According to one embodiment, the apparatus may further comprise a housing accommodating at least a part of the endless product conveyor belt and the impingement device. Such a housing may result in, for example, that a cold or hot environment efficiently can be maintained surrounding solidified portions, prior to ejection and/or after ejection.

According to one embodiment, the apparatus comprising a housing may further comprise an additional conveyor belt, wherein the additional conveyor belt at least to a part is arranged in the housing, and wherein the additional conveyor belt is arranged to receive at least partly solidified portions ejected from the moulds, and to convey the at least partly solidified portions in a direction opposite the direction of the endless product conveyor belt. Thus, efficient further solidifying or keeping solidified of ejected solidified portions may be obtained.

According to one embodiment, the second impingement temperature treatment device may be arranged to further solidify each portion of fluid such that a major part of each portions of fluid is solidified.

According to a second aspect, there is provided a use of the apparatus according to the first aspect for solidifying portions of fluid.

According to a third aspect, there is provided a method for solidifying portions of fluid the method comprising: dispensing fluid in elastic moulds comprised in an endless product conveyor belt for forming portions of fluid; subjecting the dispensed portions of fluid for impingement temperature treatment in a first temperature treatment zone during conveying of the endless product conveyor belt such that a crust on the portions of fluid at least on a surface of the fluid closest to an open end of the moulds is formed; and subjecting the portions of fluid for impingement temperature treatment in a second temperature treatment zone during conveying of the endless product conveyor belt such that at least partially solidified portions are formed wherein the first temperature treatment zone is arranged upstream the second temperature treatment zone with regard to a direction of movement of the portions of fluid. Such a method enables very efficient and rapid solidifying of portions of fluid, which portions can be efficiently handled. The solidified portions may be frozen portions.

The temperature treatment effect in the first temperature treatment zone may be lower than the temperature treatment effect in the second temperature treatment zone.

According to one embodiment, the method may further comprise ejecting the at least partly solidified portions from the moulds by deforming the elastic moulds using a shaft about which the endless product conveyor belt is arranged to travel.

According to one embodiment, the method may further comprise further solidifying the ejected at least partly solidified portions using an additional conveyor belt arranged to travel in opposite direction as compared with the endless product conveyor belt. The solidifying may be freezing.

With regards to the second and third aspects of the invention, the discussions and embodiments of the first aspect of the invention are directly applicable whereby references to these discussions and embodiments are made.

BRIEF DESCRIPTION OF THE DRAWINGS

These and other aspects of the present invention will now be described in more detail, with reference to the appended drawings showing embodiments of the invention wherein like reference numerals refer to like elements throughout unless stated otherwise.

DETAILED DESCRIPTION OF INVENTION

The following detailed descriptions of embodiments of the invention are included as examples of embodiments of the invention to improve the understanding of the invention and should not in any way be interpreted as limiting the scope of the invention.

Figure 1:
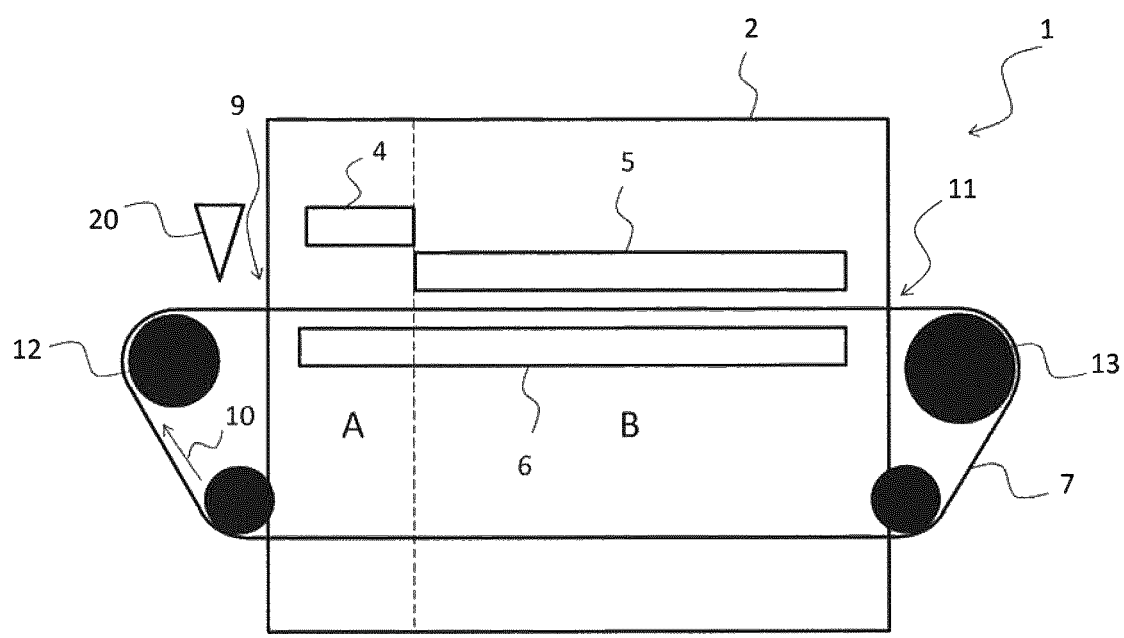
FIG. 1 is a schematic illustration of a temperature treatment apparatus according to one embodiment.

With reference to FIG. 1, an embodiment of a temperature treatment apparatus will now be discussed. The apparatus 1 is partly accommodated within a housing 2.

The temperature treatment apparatus 1 comprises two different temperature treatment zones A, B. In a first temperature treatment zone A a first impingement temperature treatment device 4 is arranged. In a second temperature treatment zone B a second impingement temperature treatment device 5 is arranged. Although the first and second impingement temperature treatment devices 4, 5 in this example are illustrated as two separate devices, they may be parts of a single impingement temperature treatment device.

The apparatus 1 further has an endless conveyor belt 7 partly accommodated by the housing 2. The conveyor belt has a plurality of moulds 8, not illustrated in FIG. 1 but in FIG. 2. The moulds 8 are, in this example, filled with fluid by means of a suitable dispensing device 20 arranged to dispense the portions of fluid in the plurality of moulds. The direction of movement of the conveyor belt 7 are illustrated by arrow 10, and it will be understood from viewing FIG. 1 that the moulds 8 filled with fluid are conveyed from left to right on the upper part of the conveyor belt 7 through the housing and passing the temperature treatment zones A, B, after which they will leave the housing 7 in the area indicated by arrow 11.

In the in FIG. 1 shown embodiment, the first and second impingement temperature treatment devices 4, 5 are arranged above the endless conveyor belt 7. Hence, the first and second impingement temperature treatment device 4, 5 are arranged to provide impingement jets impinging the fluid in the moulds. It is however, realized that other arrangements of the the first and second impingement temperature treatment devices 4, 5 are possible; other possible arrangements of the first and second impingement temperature treatment devices 4, 5 are discussed below in connection with FIG. 5.

The temperature treatment effect of the first temperature treatment zone A is lower than that of the second temperature treatment zone B, which in this example is realized by a longer distance between the portions of fluid and the first impingement temperature treatment device 4, compared to the second impingement temperature treatment device 5. Hence, the lower temperature treatment effect in the first temperature treatment zone A is provided for by a lower pressure of the impingement jets impinging the fluid in the moulds. A lower pressure of the impingement jets may also be realized, for example, by a fan with lower effect for the first impingement temperature treatment device 4. Any suitable way for obtaining an average pressure subjected on the surface of the portion of the fluid by the impingement jets being lower in the first temperature treatment zone A as compared with the second temperature treatment zone B are intended, and any suitable way of obtaining suitable temperature treatment effects in the temperature treatment zones A, B are intended to be covered. For example, the impingement temperature treatment devices 4, 5 may comprise of different units having different effects and pressures of the jets.

Efficient impingement temperature treatment in the first temperature treatment zone A will rapidly solidify a crust on the surface of the fluid without risking the fluid to spill out of the container caused by too forceful impingement jets. The solidifying may, for example, be freezing of the fluid, in which case impingement freezing is used, or, for example, heating of the fluid, such as baking of a fluid baking mixture, in which case impingement heating is used. The portions of fluid leaving the first temperature treatment zone A and entering the second temperature treatment zone B, thus, have a solidified crust on the surface, which makes it possible to subject the portions of fluid to impingement temperature treatment with the higher temperature treatment effect in the second temperature treatment zone. Thus, the apparatus enables very rapid and efficient solidifying of portions of fluid.

The temperature treatment effect of the first impingement temperature treatment device 4 should be selected such that the impingements jets do not blow the fluid out of the moulds but still with such a temperature treatment effect that the fluid is solidified at least on the surface close to the opening of the moulds. It is realized that in the case of low temperature treatment, with impingement freezing, and if the fluid have high water content a crust may be frozen on the portions of fluid. If the fluid have lower aqueous content and comprises for example fat, it may not be that a crust is frozen on the surface, but rather that the fluid is solidified by the freezing. Important is that the surfaces of the fluid in the area of the open end of the moulds are solidified such that when entering the second temperature treatment zone B, the temperature treatment effect of the second impingement temperature treatment device 5 can be selected higher than for the first impingement temperature treatment device 4 since the solidified surface prevents any spilling blowing away of the fluid from the moulds 8. Thus, the combination of the first and second temperature treatment zones A, B makes it possible to obtain very rapid temperature treatment still with minimized risks of spilling fluid from the moulds 8.

As the portions of fluid are passing the first and the second temperature treatment zones A, B, they may also be subjected to impingement temperature treatment from below via a third impingement temperature treatment device 6. The temperature treatment effect of the third impingement temperature treatment device 6 can be higher than for the first impingement temperature treatment device 4. Moreover, The temperature treatment effect of the third impingement temperature treatment device 6 can be higher than for the second impingement temperature treatment device 5. This since the conveyor belt and the bottoms of the moulds in this case prevents blowing away of fluid from the moulds 8. It is to be understood that according to this embodiment the third impingement temperature treatment device 6 is optional.

After having passed the second temperature treatment zone B, the, portions of fluid have been subjected to such temperature treatment that they are solidified on all outer surfaces. Such portions of fluid can be efficiently ejected from the moulds 8 and they may be efficiently further treated, such as packed, transported or further solidified. Thus, it is not necessary that the portions are solidified throughout their volume when being ejected.

Two shafts are acting in supporting and driving the conveyor belt 7. A drive shaft 12 may act in driving the conveyor belt 7. A first shaft 13 may be arranged for ejecting the at least partly solidified portions from the plurality of moulds, as a result of the moulds being made from flexible material and the first shaft 13 pressing against the moulds as they pass. The ejected portions of solidified fluid may be collected by suitable means (not illustrated). It is realized that the ejection of the solidified portions alternatively could take place by action of the drive shaft 12, the portions of solidified foodstuffs thus would benefit from further temperature treatment in the housing. Ejected portions of solidified fluid may be stored after ejection inside the housing for further solidification or for maintaining a low or high temperature.

According to one embodiment, the temperature treatment may be cooling, such as freezing.

According to one embodiment, the temperature treatment may be heating.

According to one embodiment, the impingement temperature treatment may be impingement freezing.

According to one embodiment, the impingement temperature treatment may be impingement heating.

Figure 2:
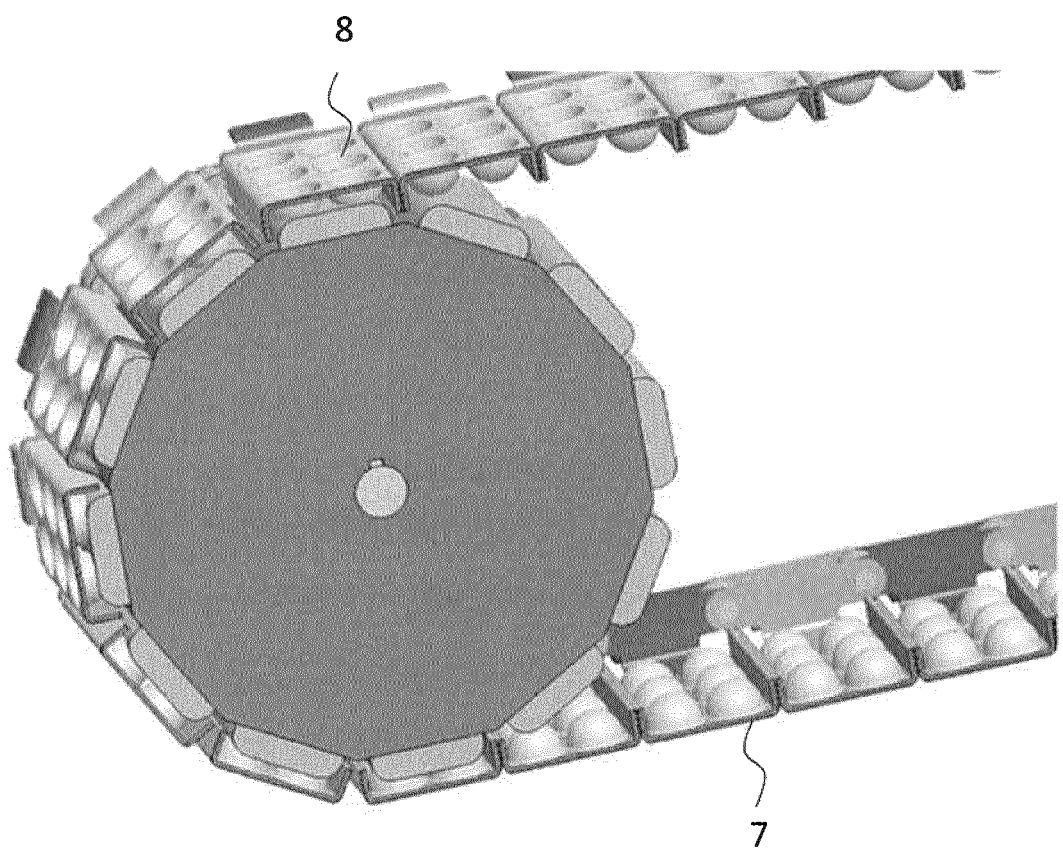
FIG. 2 is a schematic illustration of a part of a temperature treatment apparatus according to one embodiment.

FIG. 2 illustrates a part of a conveyor belt 7. The conveyor belt 7 comprises a plurality of moulds 8, in this embodiment shaped as semi spheres. It is realized that the moulds 8 could have any other suitable shape, such as for example cylindrical or cubic.

Figure 3:
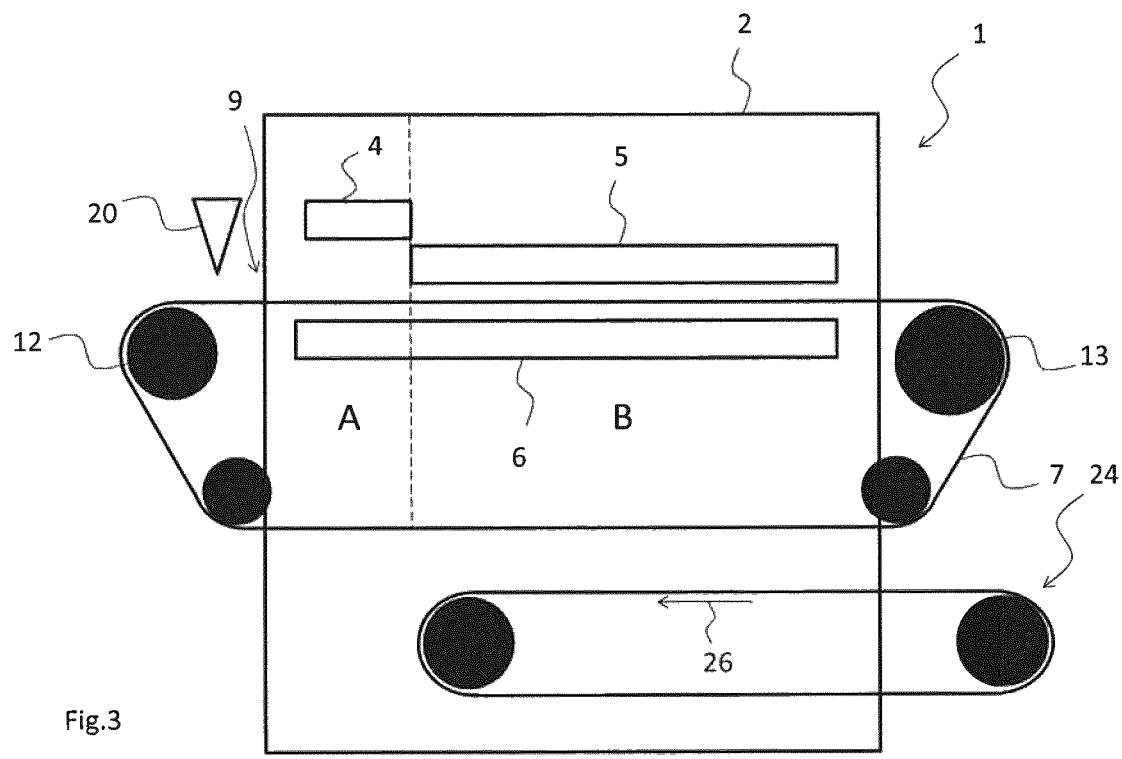
FIG. 3 is a schematic illustration of a temperature treatment apparatus according to one embodiment.

FIG. 3 illustrates an apparatus 1 as discussed above with reference to FIG. 1, with a difference that according to this embodiment, the apparatus 1 further comprises an additional conveyor belt 24 arranged to receive at least partly solidified portions ejected from the moulds 8, and to convey the solidified portions in a direction opposite the direction of the conveyor belt 7, as indicated by arrow 26.

Figure 4:
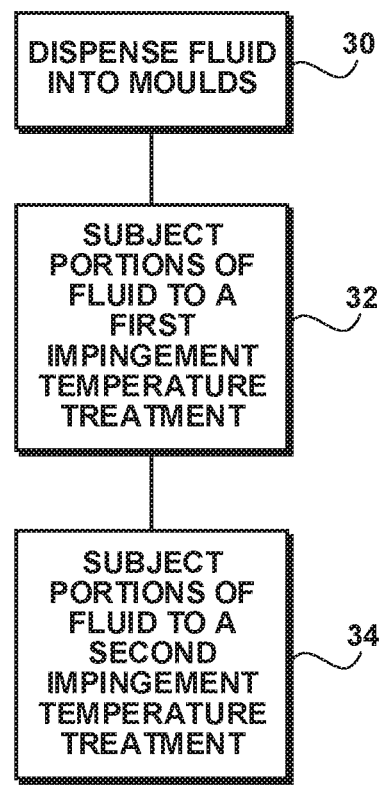
FIG. 4 is a schematic illustration of a method according to one embodiment.

With reference to FIG. 4, an embodiment of a method for solidifying portions of fluid is illustrated. The method comprises:

Dispensing 30 fluid in elastic moulds comprised in an endless product conveyor belt for forming portions of fluid;

subjecting 32 the dispensed portions of fluid for impingement temperature treatment in a first temperature treatment zone A during conveying of the endless product conveyor belt such that a crust on the portions of fluid at least on a surface of the fluid closest to an open end of the moulds is formed; and subjecting 34 the portions of fluid for impingement temperature treatment in a second temperature treatment zone B during conveying of the endless product conveyor belt such that at least partially solidified portions are formed, wherein the temperature treatment effect in the first temperature treatment zone is lower than the temperature treatment effect in the second temperature treatment zone and wherein the first temperature treatment zone is arranged upstream the second temperature treatment zone with regard to a direction of movement of the portions of fluid.

The person skilled in the art realizes that the present invention by no means is limited to the preferred embodiments described above. On the contrary, many modifications and variations are possible within the scope of the appended claims. For example, the apparatus may be fully accommodated within the housing 2.

Figure 5:
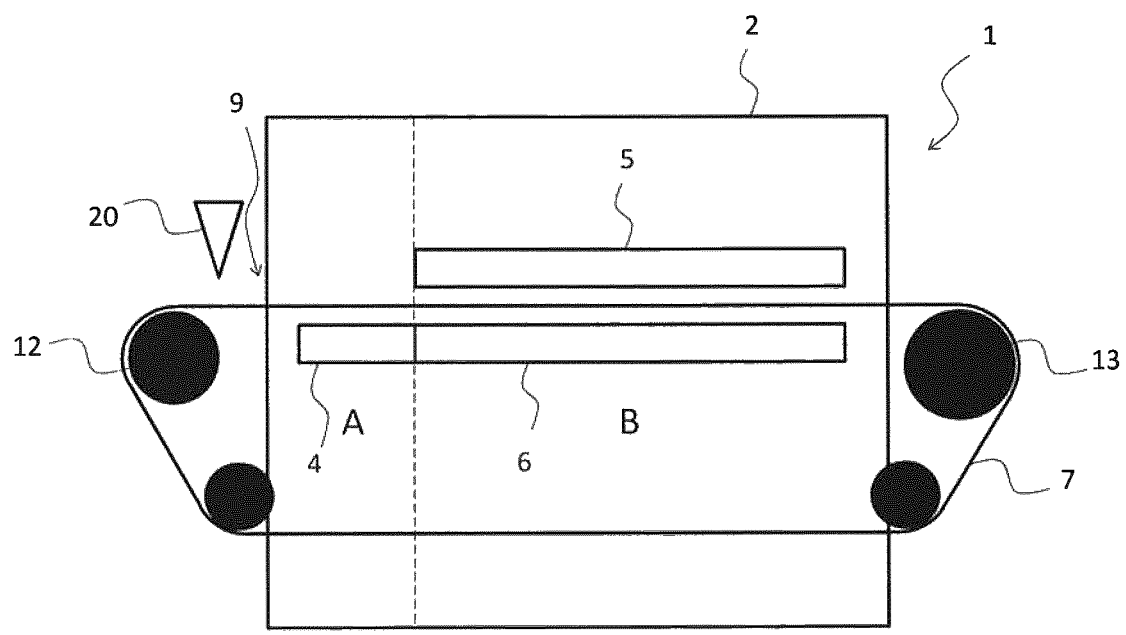
FIG. 5 is a schematic illustration of a temperature treatment apparatus according to one embodiment.

According to one embodiment of the present invention, see FIG. 5, the temperature treatment in the first temperature treatment zone A is provided by means of the first impingement temperature treatment device 4 arranged to provide impingement jets from below the moulds 8 carrying the portions of fluid, i.e. arranged to provide impingement jets at the bottoms of the moulds 8 carrying the portions of fluid. This will further limit the risk of spilling fluid from the moulds 8. Such an embodiment may optionally also comprise the third impingement temperature treatment device 6 discussed above Although the first and third impingement temperature treatment devices 4, 6 in this example are illustrated as two separate devices, they may be parts of a single impingement temperature treatment device.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A temperature treatment apparatus for solidifying portions of fluid, the apparatus comprising:
an endless product conveyor belt comprising a plurality of moulds built into the conveyor belt made of elastic material which defines unitary mould structures having a closed bottom, each of the plurality of moulds defining a cavity having an open upper end and each of the plurality of moulds being arranged to convey a portion of fluid during solidifying of the same,
first impingement jets in a first temperature treatment zone applying non-cryogenic impinging fluid to the moulds in a first temperature treatment effect,
second impingement jets in a second temperature treatment zone applying non-cryogenic impinging fluid to the moulds in a second temperature treatment effect,
wherein the first impingement jets are arranged upstream the second impingement jets with regard to a direction of movement of the portions of fluid during use of the apparatus,
wherein the treatment effect of the first temperature treatment zone is lower than the treatment effect of the second temperature treatment zone;
wherein the first temperature treatment zone is arranged to solidify a crust on the portions of fluid at least on a surface of the fluid closest to the open end of the moulds when the moulds comprising portions of fluid are conveyed through the first temperature treatment zone, and
wherein the second temperature treatment zone is arranged to further solidify the portions of fluid such that at least partly solidified portions are formed when the moulds comprising portions of fluid are conveyed through the second temperature treatment zone.

2. The apparatus according to claim 1, wherein the endless product conveyor belt is arranged to continuously transport the plurality of moulds conveying the portions of fluid.

3. The apparatus according to claim 1:
wherein a crust is formed by freezing the fluid and
wherein the portions of fluid that are at least partly solidified are frozen such that frozen portions are formed.

4. The apparatus according to claim 1, further comprising a drive shaft arranged to drive the endless product conveyor belt.

5. The apparatus according to claim 1, further comprising a dispensing device arranged to dispense the portions of fluid in the plurality of moulds.

6. The apparatus according to claim 1, wherein the second impingement jets are arranged to further solidify the portions of fluid such that a major part of each portion of fluid is solidified.

7. The apparatus according to claim 1, wherein the first and second impingement jets are arranged to apply the impingement jets impinging fluid from above the endless product conveyor in the first and second temperature treatment zones.

8. The apparatus according to claim 7, wherein the apparatus further comprises third impingement jets to apply non-cryogenic impingement fluid from below the moulds.

9. The apparatus according to claim 1, further comprising a shaft about which the endless product conveyor belt is arranged to travel and wherein the shaft is arranged to bear against the bottom of the moulds to sufficiently flex the moulds for ejecting the at least partially solidified portions from the plurality of moulds.

10. The apparatus according to claim 9, wherein each of the plurality of moulds is arranged to deform when contacted by the shaft, to cause the at least partially solidified portions to be ejected from the plurality of moulds.

11. The apparatus according to claim 1, further comprising a housing accommodating at least a part of the endless product conveyor belt and the impingement temperature treatment devices.

12. The apparatus according to claim 11:
further comprising an additional conveyor belt, wherein the additional conveyor belt at least in part is arranged in the housing, and
wherein the additional conveyor belt is arranged to receive at least partly solidified portions ejected from the moulds, and to convey the at least partly solidified portions in a direction opposite the direction of the endless product conveyor belt.

13. A method for solidifying portions of fluid, the method comprising:
dispensing fluid in elastic, deformable moulds built into the structure of an endless product conveyor belt defining a cavity with an open top and enclosed bottom for receiving portions of fluid and for forming portions of the received fluid;
subjecting the dispensed portions of fluid for non-cryogenic impingement temperature treatment in a first temperature treatment zone during conveying of the endless product conveyor belt such that a crust on the top portions of fluid at least on a surface of the fluid closest to the open top of the moulds is formed;
subjecting the fluid for non-cryogenic impingement temperature treatment in a second temperature treatment zone during conveying of the endless product conveyor belt such that at least partially solidified portions are formed,
wherein the first temperature treatment zone is arranged upstream of the second temperature treatment zone with regard to a direction of movement of the portions of fluid;
applying the non-cryogenic treatment effect of the first temperature treatment zone at a lower than the non-cryogenic treatment effect in the second temperature treatment zone; and
deforming the elastic moulds sufficiently with a shaft acting on the endless product conveyor belt to cause the at least partially solidified portions to be ejected from the elastic, deformable moulds.

14. The method according to claim 13, wherein subjecting the fluid for impingement temperature treatment comprises applying non-cryogenic impingement fluid from above the endless product conveyor.

15. The method according to claim 13, wherein elastic moulds are deformed by a shaft around which the endless product conveyor travels, the shaft having portions bearing against the bottom of the moulds.

16. The method according to claim 13, wherein the second temperature treatment zone is arranged to further solidify the fluid such that a major portion of the fluid is solidified.

* * * * *